(12) United States Patent
Chu et al.

(10) Patent No.: US 8,296,555 B2
(45) Date of Patent: Oct. 23, 2012

(54) PRELOADER

(75) Inventors: Chee Hoe Chu, San Jose, CA (US); Wei Zhou, San Jose, CA (US); Ping Zheng, San Jose, CA (US); Po-Chien Chang, Saratoga, CA (US)

(73) Assignee: Marvell World Trade Ltd., St. Michael (BB)

( * ) Notice: Subject to any disclaimer, the term of this patent is extended or adjusted under 35 U.S.C. 154(b) by 358 days.

(21) Appl. No.: 12/559,987

(22) Filed: Sep. 15, 2009

(65) Prior Publication Data
US 2010/0070751 A1  Mar. 18, 2010

Related U.S. Application Data

(60) Provisional application No. 61/098,141, filed on Sep. 18, 2008.

(51) Int. Cl.
  G06F 9/24  (2006.01)
  G06F 9/00  (2006.01)
(52) U.S. Cl. .................................. 713/1; 713/2
(58) Field of Classification Search ............ 713/2, 1
  See application file for complete search history.

(56) References Cited

U.S. PATENT DOCUMENTS

| | | |
|---|---|---|
| 5,390,165 A | 2/1995 | Tuch |
| 5,617,118 A | 4/1997 | Thompson |
| 5,673,416 A | 9/1997 | Chee et al. |
| 5,771,356 A | 6/1998 | Leger et al. |
| 5,828,835 A | 10/1998 | Isfeld et al. |
| 5,884,099 A | 3/1999 | Klingelhofer |
| 6,014,722 A | 1/2000 | Rudin et al. |
| 6,092,108 A | 7/2000 | DiPlacido et al. |
| 6,230,277 B1 | 5/2001 | Nakaoka et al. |
| 6,330,626 B1 | 12/2001 | Dennin et al. |
| 6,564,318 B1 * | 5/2003 | Gharda et al. ............ 713/2 |
| 6,711,447 B1 | 3/2004 | Saeed |
| 6,756,988 B1 | 6/2004 | Wang et al. |
| 6,823,472 B1 | 11/2004 | DeKoning et al. |
| 6,832,280 B2 | 12/2004 | Malik et al. |
| 7,089,419 B2 | 8/2006 | Foster et al. |
| 7,103,788 B1 | 9/2006 | Souza et al. |
| 7,126,913 B1 | 10/2006 | Patel et al. |
| 7,194,638 B1 | 3/2007 | Larky |
| 7,266,842 B2 | 9/2007 | Foster et al. |
| 7,299,365 B2 | 11/2007 | Evans |
| 7,308,591 B2 | 12/2007 | Dubinsky |
| 7,356,707 B2 | 4/2008 | Foster et al. |
| 7,496,952 B2 | 2/2009 | Edwards et al. |
| 7,571,216 B1 | 8/2009 | McRae et al. |

(Continued)

FOREIGN PATENT DOCUMENTS

EP   1847911   10/2007

OTHER PUBLICATIONS

"PCT Search Report", Application No. PCT/US2009/056973, (Nov. 4, 2009), 13 pages.

(Continued)

Primary Examiner — Thomas Lee
Assistant Examiner — Terrell Johnson

(57) ABSTRACT

This disclosure describes techniques and/or apparatuses for reducing the total time used to boot up a computer and load applications onto the computer.

20 Claims, 6 Drawing Sheets

U.S. PATENT DOCUMENTS

| | | | |
|---|---|---|---|
| 7,596,614 | B2 | 9/2009 | Saunderson et al. |
| 7,606,230 | B1 | 10/2009 | Cohen et al. |
| 7,774,635 | B2 | 8/2010 | Shiota |
| 7,788,670 | B2 | 8/2010 | Bodas et al. |
| 7,818,389 | B1 | 10/2010 | Chiang et al. |
| 7,873,841 | B2 | 1/2011 | Mullis, II et al. |
| 7,995,596 | B2 | 8/2011 | Kuila et al. |
| 8,000,284 | B2 | 8/2011 | Lott et al. |
| 8,001,592 | B2 | 8/2011 | Hatakeyama |
| 8,095,816 | B1 | 1/2012 | Chan et al. |
| 8,139,521 | B2 | 3/2012 | Mukherjee et al. |
| 8,171,309 | B1 | 5/2012 | Poo |
| 2002/0069354 | A1 | 6/2002 | Fallon et al. |
| 2002/0087816 | A1 | 7/2002 | Atkinson et al. |
| 2003/0014368 | A1 | 1/2003 | Leurig et al. |
| 2003/0200453 | A1 | 10/2003 | Foster et al. |
| 2003/0200454 | A1 | 10/2003 | Foster et al. |
| 2003/0208675 | A1 | 11/2003 | Burokas et al. |
| 2003/0236991 | A1 | 12/2003 | Letsinger |
| 2004/0125679 | A1 | 7/2004 | Kwean |
| 2004/0266386 | A1 | 12/2004 | Kuo |
| 2005/0033869 | A1 | 2/2005 | Cline |
| 2005/0055547 | A1 | 3/2005 | Kawamura |
| 2005/0086551 | A1 | 4/2005 | Wirasinghe et al. |
| 2005/0108171 | A1 | 5/2005 | Bajikar et al. |
| 2005/0138365 | A1 | 6/2005 | Bellipady et al. |
| 2005/0156925 | A1* | 7/2005 | Fong et al. ............... 345/418 |
| 2006/0072748 | A1 | 4/2006 | Buer |
| 2006/0075259 | A1 | 4/2006 | Bajikar et al. |
| 2006/0123248 | A1 | 6/2006 | Porter et al. |
| 2006/0136735 | A1 | 6/2006 | Plotkin et al. |
| 2006/0142906 | A1 | 6/2006 | Brozovich et al. |
| 2006/0156390 | A1 | 7/2006 | Baugher |
| 2007/0005824 | A1 | 1/2007 | Howard |
| 2007/0011445 | A1* | 1/2007 | Waltermann et al. ............ 713/2 |
| 2007/0038866 | A1 | 2/2007 | Bardsley et al. |
| 2007/0097904 | A1 | 5/2007 | Mukherjee et al. |
| 2007/0234028 | A1 | 10/2007 | Rothman et al. |
| 2007/0260905 | A1 | 11/2007 | Marsden et al. |
| 2007/0277051 | A1 | 11/2007 | Reece et al. |
| 2007/0297606 | A1 | 12/2007 | Tkacik et al. |
| 2008/0016313 | A1 | 1/2008 | Murotake et al. |
| 2008/0028243 | A1 | 1/2008 | Morisawa |
| 2008/0034411 | A1 | 2/2008 | Aoyama |
| 2008/0046732 | A1 | 2/2008 | Fu et al. |
| 2008/0066075 | A1 | 3/2008 | Nutter et al. |
| 2008/0072311 | A1 | 3/2008 | Mullick et al. |
| 2008/0104422 | A1 | 5/2008 | Mullis et al. |
| 2008/0108322 | A1 | 5/2008 | Upp |
| 2008/0120717 | A1 | 5/2008 | Shakkarwar |
| 2008/0298289 | A1 | 12/2008 | Jeyaseelan |
| 2008/0313462 | A1 | 12/2008 | Zhao et al. |
| 2009/0006658 | A1 | 1/2009 | Gough et al. |
| 2009/0049222 | A1 | 2/2009 | Lee et al. |
| 2009/0199031 | A1 | 8/2009 | Zhang et al. |
| 2010/0023747 | A1 | 1/2010 | Asnaashari et al. |
| 2010/0174934 | A1 | 7/2010 | Zhao et al. |

OTHER PUBLICATIONS

"Non-Final Office Action", U.S. Appl. No. 12/178,268, (Dec. 21, 2011), 13 pages.

"Non-Final Office Action", U.S. Appl. No. 12/636,558, (Jan. 10, 2012), 6 pages.

"Notice of Allowance", U.S. Appl. No. 12/098,254, (Dec. 14, 2011), 4 pages.

"Notice of Allowance", U.S. Appl. No. 12/271,761, (Jan. 3, 2012), 6 pages.

"Extensions to Direct Link Setup (DLS) Comments", IEEE, P802.11z, (Jul. 2009), pp. 1-3.

"Final Office Action", U.S. Appl. No. 12/098,254, (May 18, 2011), 11 pages.

"Final Office Action", U.S. Appl. No. 12/178,268, (May 25, 2011), 13 pages.

"Non-Final Office Action", U.S. Appl. No. 12/098,254, (Jan. 14, 2011), 8 pages.

"Non-Final Office Action", U.S. Appl. No. 12/101,668, (Apr. 5, 2011), 7 pages.

"Non-Final Office Action", U.S. Appl. No. 12/178,268, (Dec. 22, 2010), 10 pages.

"Non-Final Office Action", U.S. Appl. No. 12/271,761, (Oct. 3, 2011), 6 pages.

"Non-Final Office Action", U.S. Appl. No. 12/541,731, (Oct. 21, 2011), 9 pages.

"Notice of Allowance", U.S. Appl. No. 12/098,254, (Sep. 28, 2011), 4 pages.

"Part 11—Wireless LAN Medium Access Control (MAC) and Physical Layer (PHY) Specifications", *Information Technology—Telecommunications & Information Exchange Between Systems . . . International Standard*, ISO/IEC 8802-11, First Ed., (1999), pp. 1-531.

"PCT Partial Search Report", Application Serial No. PCT/US2008/078343, Partial International Search,(Mar. 5, 2009), 2 pages.

"PCT Search Report and Written Opinion", Application No. PCT/US2009/067767, (Mar. 26, 2010), 12 pages.

"PCT Search Report", Application Serial No. PCT/US2008/078343, (May 18, 2009), 5 pages.

"Restriction Requirement", U.S. Appl. No. 12/101,668, (Sep. 22, 2011), 6 pages.

"Final Office Action", U.S. Appl. No. 12/101,668, (May 10, 2012), 8 pages.

"Final Office Action", U.S. Appl. No. 12/541,731, (May 31, 2012), 11 pages.

"Foreign Office Action", European Patent Application No. 09803951.4, (May 24, 2012), 3 pages.

"Non-Final Office Action", U.S. Appl. No. 12/636,558, (May 29, 2012), 8 pages.

"Non-Final Office Action", U.S. Appl. No. 13/333,551, (Apr. 6, 2012), 5 pages.

"Notice of Allowance", U.S. Appl. No. 13/333,551, (May 30, 2012), 4 pages.

"Non-Final Office Action", U.S. Appl. No. 12/541,731, Sep. 4, 2012, 11 pages.

"Non-Final Office Action", U.S. Appl. No. 12/101,668, Aug. 9, 2012, 8 pages.

"Notice of Allowance", U.S. Appl. No. 12/178,268, Jul. 2, 2012, 4 pages.

* cited by examiner

PRELOADER

RELATED APPLICATION

This application claims priority to U.S. Provisional Patent Application Ser. No. 61/098,141 filed Sep. 18, 2008, the disclosure of which is incorporated by reference herein in its entirety.

BACKGROUND

When a personal computer is powered on, a Basic Input/Output System (BIOS) is the first code executed. Conventional BIOS identify, test, and initialize system devices, such as hard disks and other hardware. In so doing, the BIOS prepares the personal computer so that operating system software can be loaded, executed, and given control. This process of preparing a personal computer is called booting up. Booting up a personal computer is often slow, especially when the computer's operating system is large, which is more and more often the case.

Not only can booting up a computer be quite slow, a user then waits for applications to load. If the user wants to check email or prepare a word-processing document, the user conventionally turns on the personal computer, waits for it to boot up, and then waits for applications to load.

SUMMARY

This disclosure describes a method for providing one or more applications for preloading onto memory at least partially during boot up, receiving selection of one of the applications, and preloading the application into the memory at least partially during boot up. In some embodiments this method provides the applications by presenting a graphical user interface having selectable text or icons associated with each of the one or more applications. In some other embodiments of this method, the method further includes determining logic blocks of the application to preload and preloading the application by preloading the logic blocks. In such an embodiment, the method may also repeat the operations of receiving the selection of one or more of the applications to provide other selected applications and determining logic blocks of the other selected applications. In such an embodiment, the logic blocks include those of the other selected applications.

This disclosure also describes a controller configured to access, responsive to a boot-up process commencing, one or more applications stored on a hard disk drive, read the applications from the hard disk drive, and preload, at least partially during the boot-up process, the applications onto memory, the memory accessible by a computer on which the boot-up process is performed. In some cases the one or more applications are not associated with a Basic Input/Output System (BIOS) or an Operating System (OS) boot up. In some embodiments the access of one or more applications accesses an index of logic blocks associated with the one or more applications (the logic blocks stored on the hard disk drive and the index identifying the logic blocks), the read of the applications from the hard disk drive includes reading the logic blocks from the hard disk drive that are identified in the index, and the preload of the applications preloads the logic blocks onto the memory. In these some embodiments the controller can further be configured to receive, prior to the boot-up process commencing, the index and save the index on the memory. In some other of these embodiments the controller can be configured such that the index of logic blocks associated with one or more applications comprises logic blocks associated with multiple applications. In still some other of these embodiments, the controller can be configured such that the preload of the logic blocks preloads the logic blocks associated with a particular one of the one or more applications prior to completion of the boot-up process.

Further still, in other embodiments, the controller is configured such that the index is also of additional logic blocks associated with one or more additional applications stored on the hard disk drive or another hard disk drive, the order indicating the additional logic blocks to be preloaded after completion of the boot-up process, and also configured to preload the additional logic blocks onto the memory after completion of the boot-up process.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Overview

As noted in the Background above, conventional techniques for booting up a computer and loading applications onto the computer can be quite slow. This is often true even if relatively new memory technology is used, such as flash memory or other solid state drives (SSD). This disclosure describes techniques and apparatuses for reducing the total time used to boot up a computer and load applications onto a computer.

In the discussion that follows, an example operating environment is described. Example methods are also described that may be employed in the example operating environment as well as other environments. These methods are followed by an example hard-disk-drive embodiment and an example computing-system environment in which components of FIG. 1 may be embodied. In the discussion below, reference will be made to the environment by way of example only and, therefore, implementations described below are not limited to the example environment.

Example Operating Environment

Figure 1:
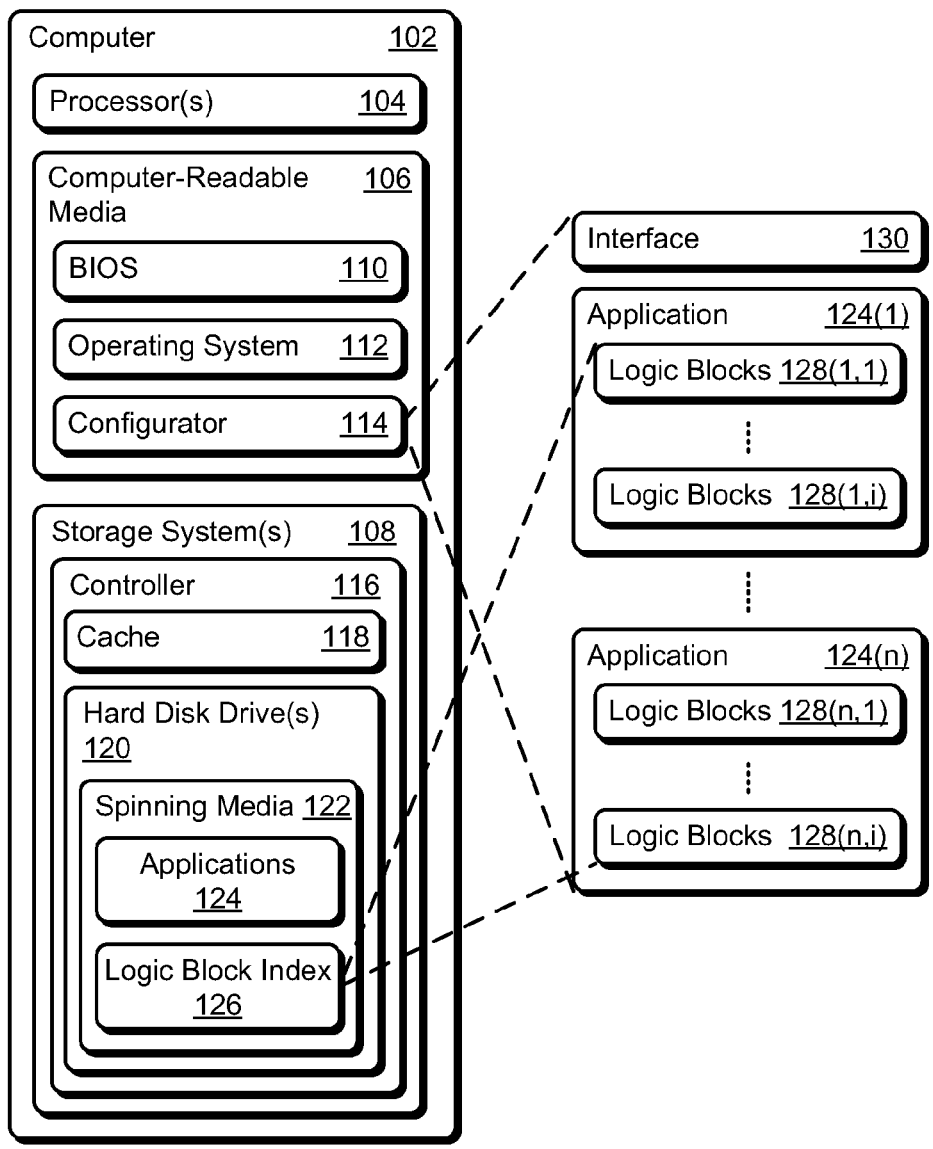
FIG. 1 illustrates an example operating environment that is configured to enable preloading techniques.

FIG. 1 illustrates an example operating environment 100, which includes a computer 102, such as a desktop personal computer, laptop, server, handheld computer, or other computing device. Computer 102 includes one or more processors 104, computer-readable media 106, and storage system(s) 108.

Processors 104 are capable of executing various programs, including those shown in computer-readable media 106. Computer-readable media 106 may include various kinds of volatile and non-volatile media, such as random access memory, flash memory, or hard disk drive(s). These hard disk drives may include or exclude those of storage system 108. Thus, storage system 108 may be the same as those included in computer-readable media 106 or be separate. Storage system 108 may also be separate from but accessible by computer 102, such as when operating as or including a wired, external hard drive. Computer-readable media 106 is shown including a Basic Input/Output System (BIOS) 110, an Operating System (OS) 112, and a configurator 114.

BIOS 110 is configured to execute in booting-up situations, such as when computer 102 is powered on, restarted, or woken up from hibernation. BIOS 110 prepares computer 102 so that operating system 112 can be loaded, executed, and given control. This preparation includes various actions, such as identifying, testing, and initializing system devices (e.g., storage system(s) 108). Operating system 112 is configured to take control of computer 102 during or following BIOS 110's boot-up operations. Operating system 112 is loaded onto system memory (not shown except as part of computer-readable media 106) prior to execution by processor(s) 104.

Storage system(s) 108 are configured to provide non-volatile memory storage using controller 116, which includes or has access to cache 118 and hard disk drive(s) 120. Hard disk drive(s) 120 include spinning media 122, such as magnetic or optical disks. Storage system(s) 108 may include a single or numerous hard disk drives, such as a RAID-controlled group of simple disk drives. If a RAID-controlled group, controller 116 is a RAID controller having significant amounts of cache memory (e.g., cache 118 is in the GB range). Spinning media 122 may store any of the elements included in computer-readable media 106, applications 124, and/or one or more logic-block index(es) 126. While FIG. 1 illustrates and environment 100 includes hard disk drives 120 and spinning media 122, other forms of memory may be used. These other forms of memory may include semiconductor or solid state memory, magnetic tape, or optical disk, to name a few.

Applications 124 may include many different software programs or routines and functions thereof, which may or may not be associated with the operating system. Non-operating-system (non-OS) applications include word-processing, email, calendar, browsing, gaming, and graphics programs, to name just a few. Applications associated with an operating system may include executable applications, applets, or various memory-based resources usable by the operating system during boot up. Applications 124 are shown including some number of applications 1 to n.

Cache 118 is configured to store logic blocks 128 of the various applications 124, which permits processors 104 to quickly load onto system memory the applications associated with the logic blocks 128. Cache 118 may include various types of memory or buffers, such as a Dynamic Random Access Memory (DRAM) or a Peripheral Component Interconnect Express (PCIe). For clarity logic blocks 128 are labeled (1,1) through (1,i) for those associated with application 124(1), and (n,1) through (n,i) for those associated with application 124(n), where the number of logic blocks is some number from 1 to i for each application 124.

Controller 116 is configured to preload logic blocks 128 at least partially during a boot-up process of computer 102. This preloading permits OS 112 to quickly access and execute the applications having these logic blocks. Controller 116 may include a cache controller card or a hard-disk-drive microcontroller, e.g., firmware and a microprocessor.

Configurator 114 is configured to determine applications for preloading (e.g., applications 124(1) to 124(n)), determine logic blocks associated with these determined applications (e.g., logic blocks 128(1,1) to (1,i) and 128(n,1) to (n,i)), and provide identifiers for these logic blocks (e.g., logic block index 126) for use by controller 116 (relationships illustrated using dashed lines in FIG. 1). Configurator 114 includes an interface 130 and applications 124 determined for preloading (shown with dashed lines). Interface 130 may aid configurator 114 in determining which applications 124 to preload, such as by enabling selection of applications by a user of computer 102. As will be described below, configurator 114 may determine applications and/or other logic blocks for preloading in other manners, including based on a history of application use.

Methods and techniques that may use these components of environment 100 are set forth in detail below.

Example Methods

As noted above, conventional techniques for booting up a computer and loading applications onto the computer can be quite slow. This disclosure describes techniques and apparatuses for reducing the total time used to boot up a computer and load applications onto the computer, for example. These techniques include example methods, which may be used separately or in combination. Aspects of these methods may be implemented in hardware, firmware, software, or a combination thereof. The methods specify operations performed by one or more entities and are not necessarily limited to the order shown for performing the operations or the entities given as examples for performing the operations.

Figure 2:
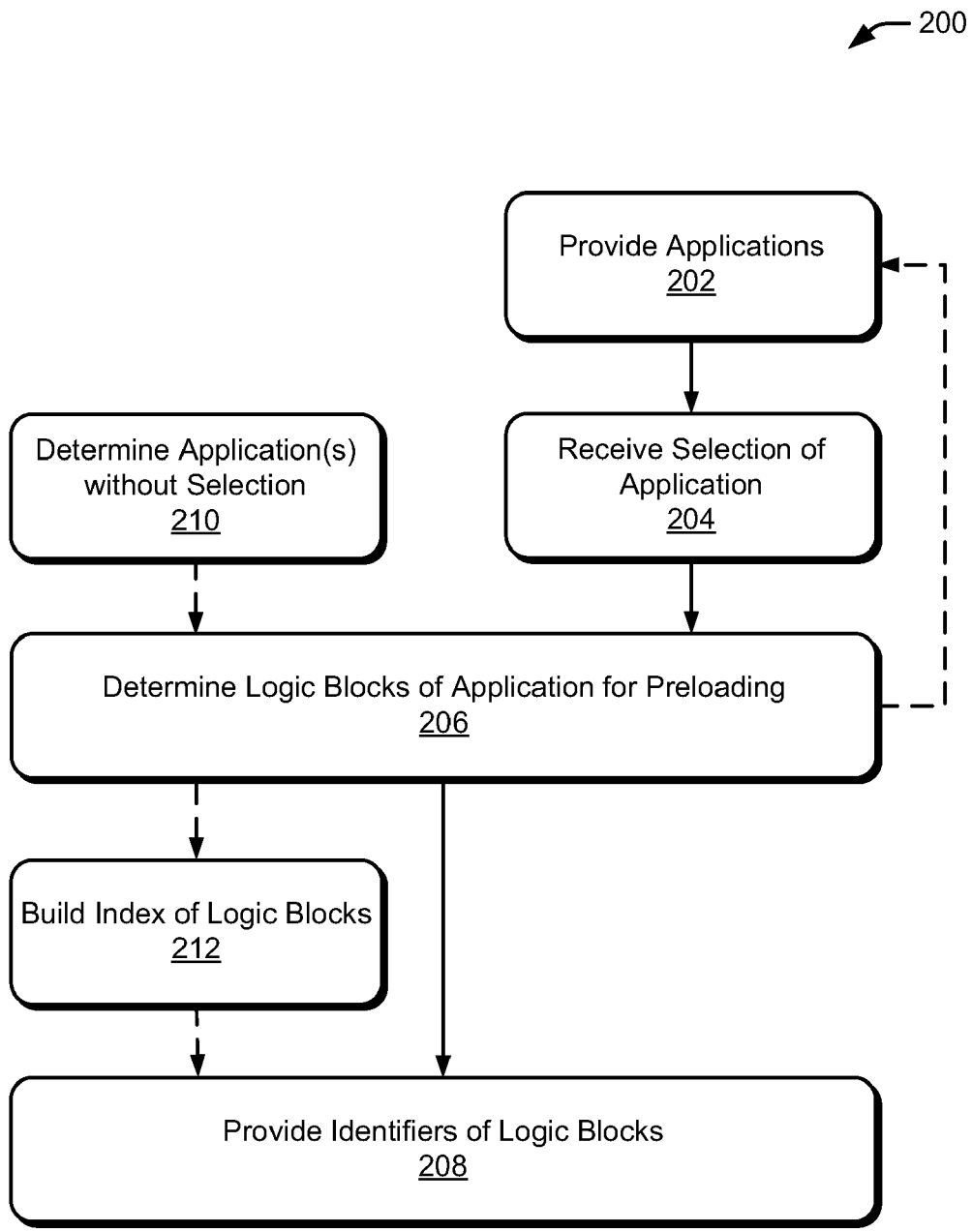
FIG. 2 illustrates a method for determining applications for preloading.

FIG. 2 depicts a method 200 for determining applications for preloading. At 202, applications for partial or complete preloading onto cache memory are provided. In an example with reference to environment 100, interface 130 of configurator 114 provides a graphical user interface displaying text and icons associated with applications 124(1) through 124(n), such as word-processing, email, gaming, and graphics applications. These applications can be predetermined, such as those previously loaded onto spinning media 122 of hard disk drives 120, or they may be simply some collection of applications accessed by computer 102 from various local and remote sources. A user may select any one or many of these applications for preloading, though preloading is not necessarily completely or always performed during boot up, such as in cases where the cache is not sufficiently large to hold all of the selected applications' logic blocks.

At 204, selection of one of the applications is received. Here interface 130 receives some indication from a user that preloading of one of applications 124 is desired.

At 206, logic blocks of the application for preloading onto cache memory are determined. Here configurator 114 determines which logic blocks 128 are appropriate for the selected application 124, such as various executable portions. Configurator 114 may also determine an appropriate order for these logic blocks 128, such as ordering later those that build on others or ordering based on which order is most likely to permit a fastest execution of the application.

Method 200 may continue to enable selection of applications, thereby permitting more than one application to be preloaded. This is shown with a dashed line from 206 to 202. For each selected application, at 206 method 200 determines logic blocks. Following logic-block determination, method 200 may proceed to 208. At 208, method 200 provides identifiers for the logic blocks to an entity or component capable of preloading the logic blocks, such as partially or completely during boot up.

Alternatively or additionally, configurator 114 may determine which applications to preload without user selection. At 210, configurator 114 may determine which applications to preload and their order of preloading based on a history of application use or with a predetermined order, such as one set by a manufacturer of computer 102, application(s) 124, or OS 112.

At 212, method 200 may also or additionally build an index of ordered identifiers for these logic blocks. Configurator 114 may build index 126 based on an order of selection by a user, or based on other considerations, such as a largest number of applications likely to be cached before completion of the boot-up process for computer 102. The order may also be set by a user or set based on a history of which applications the user selects to execute and/or when the user does so.

If the applications are not those that are accessible during boot up by the entity responsible for preloading (e.g., controller 116), the applications may be loaded to such a location at or following 206. Thus, configurator 114 may load applications onto spinning media 122 after selection or determination of these applications. Conversely, at 202, configurator 114 may instead provide applications 124 that are already accessible by controller 116. These applications 124 can be accessed by controller 116 because they were loaded on spinning media 122 prior to the current boot up.

Alternatively or additionally to performing method 200, configurator 114 may provide other, additional applications, which may be preloaded after boot up. In such a case, configurator 114 follows method 200 for these additional applications. By so doing, applications may be preloaded following boot up, which may speed up the process of executing that application. If a user, for example, often opens a browsing application at 9:00 a.m., such as to check stock prices, configurator 114 is capable of learning this usage history of the user (or enables this selection directly by the user). Configurator 114 may indicate this in logic block index 126 so that controller 116 will preload logic blocks 128 associated with a browsing application at 8:55 a.m.

Figure 3:
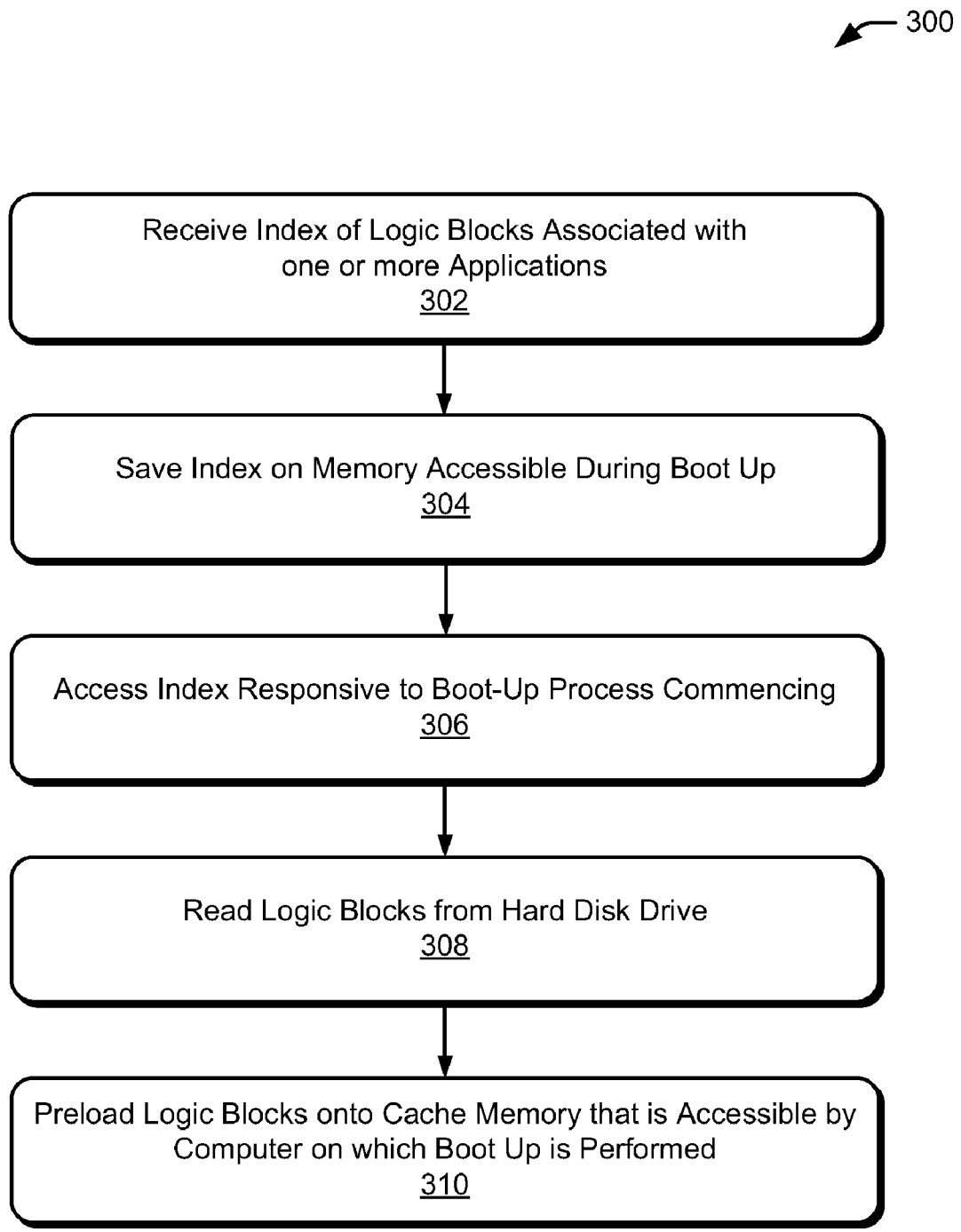
FIG. 3 illustrates a method for preloading applications at least partially during a boot-up process.

FIG. 3 depicts a method 300 for preloading applications at least partially during a boot-up process. At 302, identifiers (e.g., an index) of logic blocks associated with one or more applications are received. As noted in the above environment 100 and continuing the example described with reference to method 200, controller 116 receives logic block index 126, which identifies logic blocks 128 associated with various applications 124.

At 304, the index received is saved onto memory accessible during a boot-up process. This memory holds the index but makes it available during boot up, such as during BIOS and/or OS booting. Here index 126 is saved in spinning media 122 and is accessible during BIOS and OS boot up by controller 116.

At 306, the index responsive to a boot-up process commencing is accessed. Here controller 116 receives an indication that a boot-up process is commencing by being powered on or from receiving the indication directly from the BIOS. Thus, controller 116 is capable of accessing parts of memory on hard disk drive 120 without the boot-up processing of computer 102 completing. While the BIOS, OS, or other portions of the boot-up process are booting up, controller 116 may access index 126 and move forward with the rest of method 300. Note that 302 and 304 are performed prior to the boot-up process commencing, such as during some prior use of the computer.

At 308, logic blocks from the hard drive on which the logic blocks are saved are read. As noted, the index identifies the logic blocks to read, as well as an order of those logic blocks. Continuing the example, controller 116 reads logic blocks 128 in the order given in index 126.

At 310 these logic blocks are preloaded, at least partially during the boot-up process, onto a cache memory that is accessible by a computer on which the boot-up process is performed. 310 can be performed for each singular logic block that is read, such that some operations of method 300 are performed repeatedly. Here controller 116 reads each logic block 128 in the order given in index 126 and then saves that logic block to cache 118. Cache 118 is accessible by computer 102, including indirectly through controller 116 or directly through some other component of computer 102.

By way of example, two applications (n=1 and n=2) are to be preloaded. Assuming that the first application has four logic blocks (i=4) and the second application has six logic blocks (i=6), index 126 orders logic blocks in the following order: 1-1, 1-2, 1-3, 1-4, 2-1, 2-2, 2-3, 2-4, 2-5, and 2-6.

Figure 4:
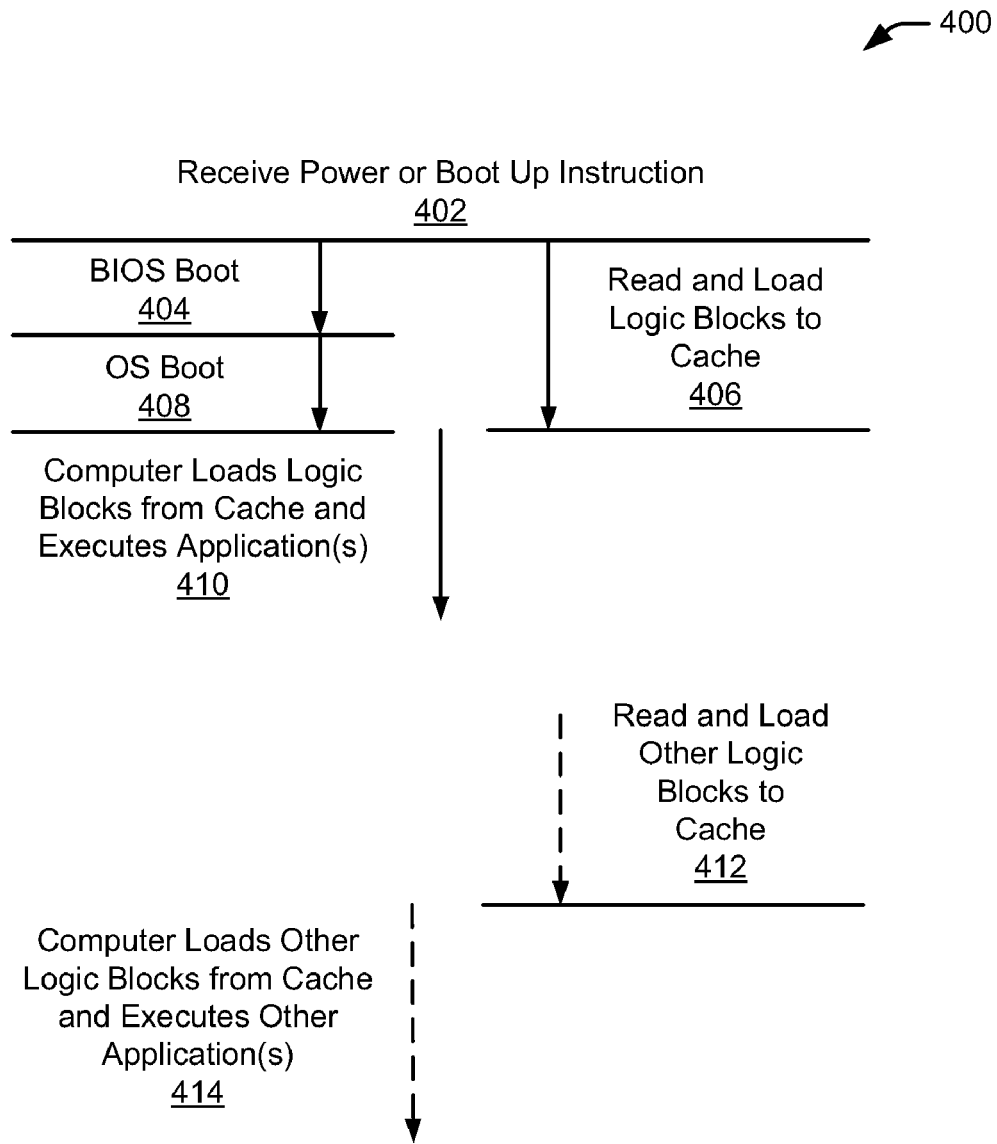
FIG. 4 illustrates an example timeline indicating when some operations of the method illustrated in FIG. 3 can be performed.

Consider also FIG. 4, which shows an example timeline 400 indicating when some operations of method 300 can be performed. Firstly, power or a boot-up instruction is received at 402. Responsive to this, BIOS 110 is booted up and begins checks and other tasks to prepare computer 102 for OS 112, which is shown as time duration 404. Also responsive to the powering up or boot-up instruction, controller 116 reads and loads logic blocks 128 associated with at least one of applications 124 onto cache 118 during time duration 406. While this is performed, OS 112 also boots during time duration 408. Note that when the boot-up process is complete and OS 112 has control of computer 102, OS 112 may quickly load logic blocks for one or more of applications 124 to system memory. Once the logic block or blocks are loaded to system memory, OS 112 may begin to execute the associated application(s) 124. This is shown as time duration 410. Reading and loading blocks over time duration 406 can be performed by controller 116 following 308 and 310 in FIG. 3.

Note also optional time durations 412 and 414. Over time duration 412, controller 116 may load other logic blocks for other applications, either those for which the cache did not have room during boot-up or others based on some other indication, such as a time to load logic blocks for executing an application at a particular time or order (e.g., a stock-ticker browser at 8:55 a.m.). After logic blocks are loaded onto system memory by computer 102 for execution of the associated application, the logic blocks may be deleted from cache 118 by controller 116, which opens up room for loading other logic blocks.

These methods may enable use of less-expensive memory resources, as hard disk drives are often less expensive than SSD or Flash memory. Further, these methods may also enable quicker execution of applications.

Hard Drive Example

Figure 5:
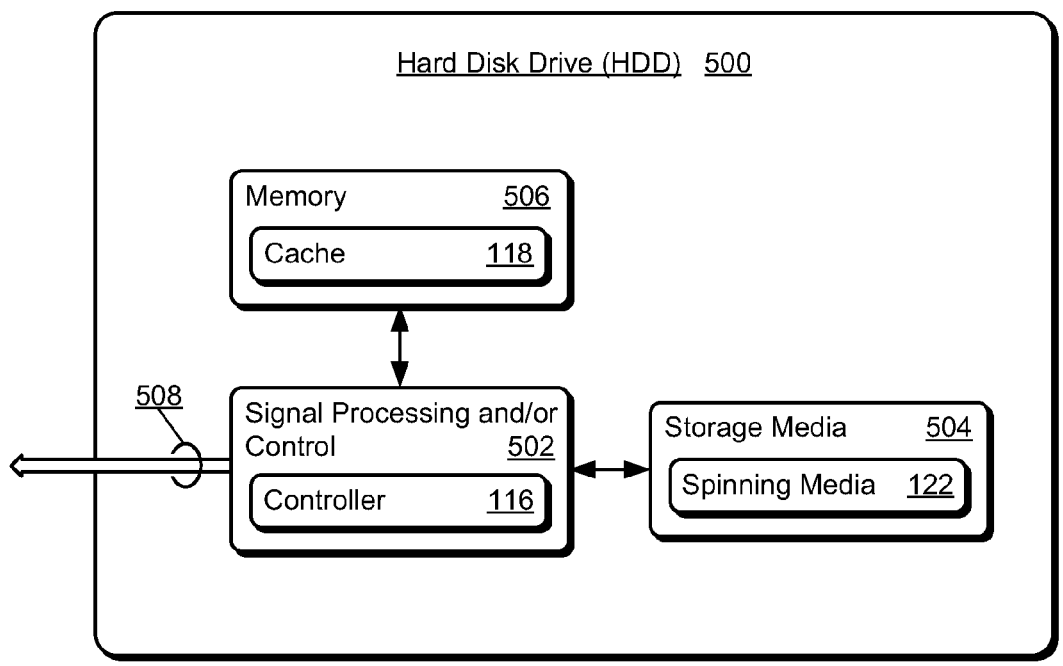
FIG. 5 illustrates an example hard-disk-drive environment for implementing embodiments of the techniques.

FIG. 5 illustrates an example hard disk drive (HDD) 500, which can implement various techniques described herein. HDD 500 includes signal processing and/or control circuit(s) generally identified at 502, storage media 504, and/or a memory 506. By way of example, signal processing and/or control circuit(s) may include controller 116, storage media 504 may include spinning media 122, and memory 506 may include or be random access memory (RAM), a low-latency nonvolatile memory such as flash memory, read only memory (ROM), and/or other suitable electronic data storage, such as cache 118. Controller 116, spinning media 122, and cache 118 are also illustrated in FIG. 1.

In various implementations, the signal processing and/or control circuit(s) 502 can be implemented to read and preload data, process data, perform data calculations, and/or format data. The data can be output to and/or received from at least storage media 504 and/or memory 506. In addition, HDD 500 can communicate with a host device via one or more wired or wireless communication links 508. The host device may include a desktop or server computer, mobile computing devices, a personal digital assistant, cellular phone, media or MP3 player, and/or other devices (e.g., computer 102 of FIG. 1).

In one implementation signal processing and/or control circuit(s) 502 may comprise a System-on-Chip (SoC) integrated with electronic circuitry, a microprocessor, memory, input-output (I/O) logic control, communication interfaces and components, other hardware, firmware, and/or software to run HDD 500. The SoC can also include an integrated data bus (not shown) that couples the various components of the SoC for data communication between the components.

Computing-System Example

Figure 6:
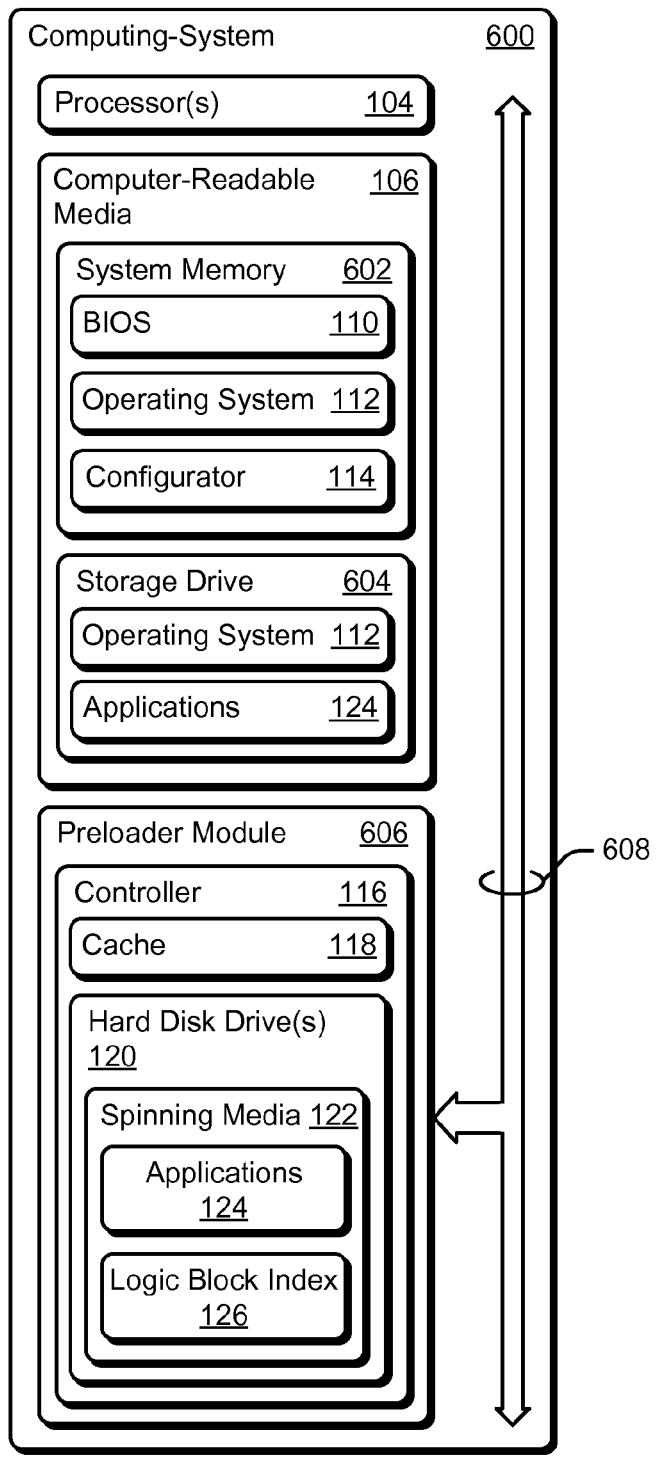
FIG. 6 illustrates an example computing-system environment for implementing embodiments of the techniques.

FIG. 6 illustrates an example computing-system 600, in which the techniques described herein can be implemented. Computing-system 600 includes various components described above in association with operating environment 100 such as, processor(s) 104 and computer-readable media (CRM) 106. In this example, CRM 106 includes system memory 602 from which BIOS 110, OS 112, and configurator 114 can be accessed and/or executed by processor 104. System memory 602 may include DRAM, ROM, Flash memory and the like. CRM 106 also includes storage drive 604 for storing data of OS 112 and applications 124 of computing-system 600. Storage drive 604 may be any suitable type of drive device such as a hard disk drive or solid-state drive from which OS 112 is booted. For example, when power is applied to computing-system 600, processor 104 fetches and executes data of OS 112 from storage drive 604 during a boot-up process.

Computing-system 600 also includes preloader module 606 having controller 116 that includes cache 118 and hard disk drive(s) 120. Preloader module 606 communicates data with other components of computing-system 600 (e.g. processor 104 or system memory 602) via system bus 608, which may include a peripheral component interconnect (PCI) bus or PCI-Express bus. Cache 118 may include any suitable type of electronic storage such as DRAM, flash memory, and the like. Controller 116 is configured to preload applications 124 at least partially during the boot-up process of computing-system 600. Preloading applications 124 may include fetching applications from hard disk drive 120 and loading them into cache 118. By so doing, OS 112 may launch applications from cache 118 of preloader module 606 more quickly than applications launched from storage drive 604 of computing-system 600.

One or more of the methods described above can be performed by one or more programmable processors executing a computer program to perform functions by operating on input data and generating output. Generally, the techniques can take the form of an entirely hardware embodiment, an entirely software embodiment, or an embodiment containing both hardware and software components. In one implementation, the methods are implemented in software, which includes but is not limited to firmware, resident software, microcode, etc. Furthermore, the methods can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
   providing one or more applications for preloading into a first memory at least partially while an operating system (OS) is being loaded into a second memory;
   receiving selection of one of the applications; and
   preloading the selected application into the first memory at least partially while the OS is being loaded into the second memory thereby enabling the OS, once loaded into and executed from the second memory, to load the selected application from the first memory.

2. The method of claim 1, wherein the applications are not associated with a basic input/output system (BIOS) or the (OS).

3. The method of claim 1, further comprising determining logic blocks of the selected application to preload and wherein preloading the application preloads the logic blocks of the selected application into the first memory.

4. The method of claim 3, further comprising repeating the operations of receiving the selection of one of the applications to provide other selected applications and determining logic blocks, and wherein the logic blocks include those of the other selected applications.

5. The method of claim 4, further comprising:
   enabling selection of an order in which to preload the logic blocks associated with the selected application and the one or more other selected applications;
   receiving a selected order; and
   providing identifiers of the logic blocks in the selected order effective to enable preloading in the selected order.

6. The method of claim 4, further comprising providing an index of the logic blocks, the index indicating an order in which to preload the logic blocks into the first memory, the order based on a history of use of the selected application and the other selected applications.

7. The method of claim 1, wherein providing one or more applications includes presenting a graphical user interface having selectable text or icons associated with each of the one or more applications.

8. The method of claim 1, wherein the one or more applications include one or more of a word-processing program, a browsing program, an email program, or a graphics program.

9. The method of claim 1, wherein the one or more applications are those that are previously loaded onto one or more hard disk drives from which the one or more applications are capable of being read at least partially while the OS is loaded into the second memory.

10. The method of claim 1, further comprising, responsive to receiving the selection of the application, loading the selected application onto one or more hard disk drives from which the selected application is capable of being read at least partially while the OS is loaded into the second memory.

11. The method of claim 1, wherein the act of preloading includes preloading the selected application into the first memory at least partially while a basic input/output system (BIOS) is loaded into or executed from the second memory.

12. A controller configured to:
   access, responsive to a boot-up process of a computer commencing, one or more applications stored on a first hard disk drive;
   read the applications from the first hard disk drive; and
   preload, at least partially, the one or more applications from the first hard disk drive into a first memory while an operating system (OS) of the computer is loaded from a second hard disk drive into a second memory as part of the boot-up process thereby enabling the computer to load and execute the one or more applications from the first memory on completion of the boot-up process.

13. The controller of claim 12, wherein access one or more applications accesses an index of logic blocks associated with the one or more applications, the logic blocks stored on the first hard disk drive and the index identifying the logic blocks, read the applications from the first hard disk drive includes reading the logic blocks from the first hard disk drive that are identified in the index, and preload the applications preloads the logic blocks into the first memory.

14. The controller of claim 13, further configured to receive, prior to the boot-up process commencing, the index and save the index on the first memory.

15. The controller of claim 13, wherein the index of logic blocks associated with one or more applications comprises logic blocks associated with multiple applications.

16. The controller of claim 13, wherein the preload of the logic blocks preloads the logic blocks associated with a particular one of the one or more applications prior to completion of the boot-up process.

17. The controller of claim 13, wherein the preload of the logic blocks preloads the logic blocks into the first memory in parallel with and during a loading of a basic input/output system (BIOS).

18. The controller of claim 13, wherein the index indicates an order in which to preload the logic blocks and wherein the preload is performed in the order.

19. The controller of claim 13, wherein the index is also of additional logic blocks associated with one or more additional applications stored on the first hard disk drive, the index indicating the additional logic blocks to be preloaded after completion of the boot-up process, and further configured to preload the additional logic blocks into the first memory after completion of the boot-up process.

20. The controller of claim 12, wherein the controller is directly coupled with the first memory, the first hard disk drive, and a peripheral component interconnect express (PCI Express) bus of the computer.

* * * * *